United States Patent

[11] 3,534,769

[72] Inventor Treffle J. Leveque
    16606 Glastonbury, Detroit, Michigan 48219
[21] Appl. No. 756,826
    Sept. 3, 1968
[45] Patented Oct. 20, 1970

[54] VALVE FOR CONTROLLING SPEED AND WORKING PRESSURE OF AIR MOTORS
    1 Claim, 7 Drawing Figs.
[52] U.S. Cl. .................................. 137/501, 91/29, 137/513.7
[51] Int. Cl. .................................. F16k 31/36
[50] Field of Search .................................. 137/110, 501, 503, 513.7, 517, 599; 91/29, 59

[56] References Cited
UNITED STATES PATENTS

| | | | |
|---|---|---|---|
| 1,372,915 | 3/1921 | Smith | 91/59X |
| 2,524,114 | 10/1950 | Millat | 91/29X |
| 3,123,091 | 3/1964 | Elsey | 137/599X |
| 3,403,697 | 10/1968 | Fenton | 137/517 |

Primary Examiner—Robert G. Nilson
Attorney—Harness, Dickey and Pierce

ABSTRACT: The valve has an adjustable setting for producing the operation of an air motor at a selected speed and when a load is applied to the motor the back pressure thereof opens the valve to working pressure which may also be limited by an adjustable setting.

Patented Oct. 20, 1970
3,534,769
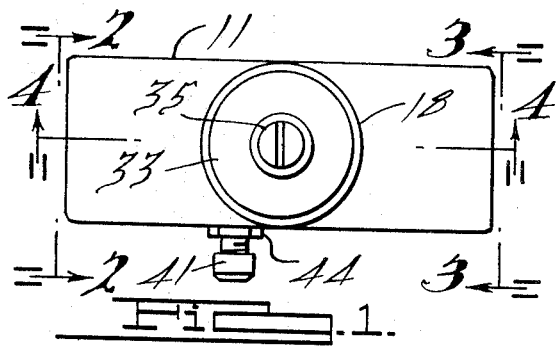
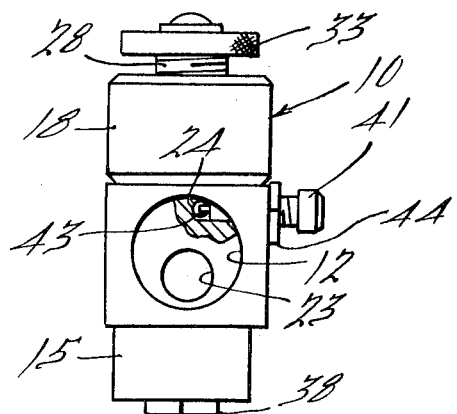
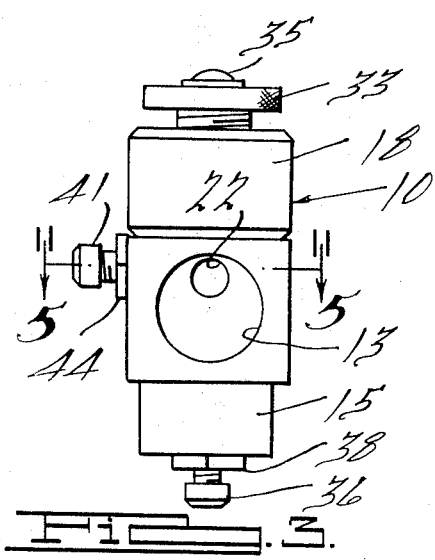
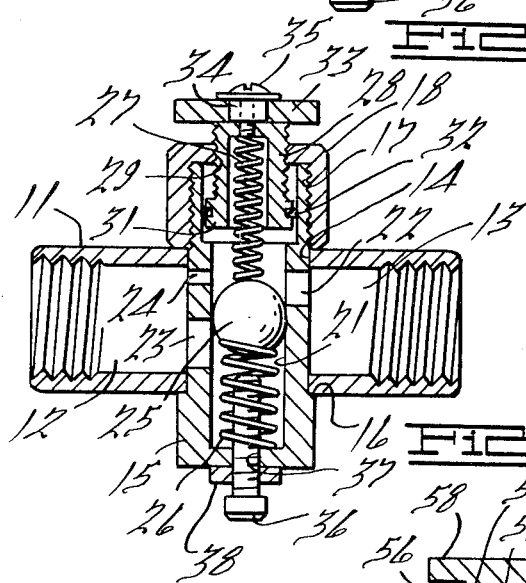
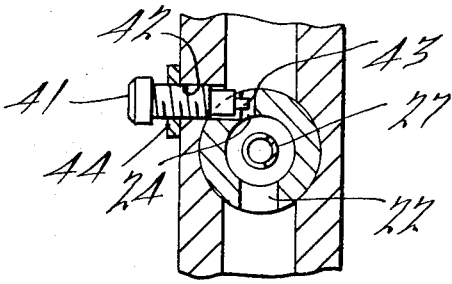
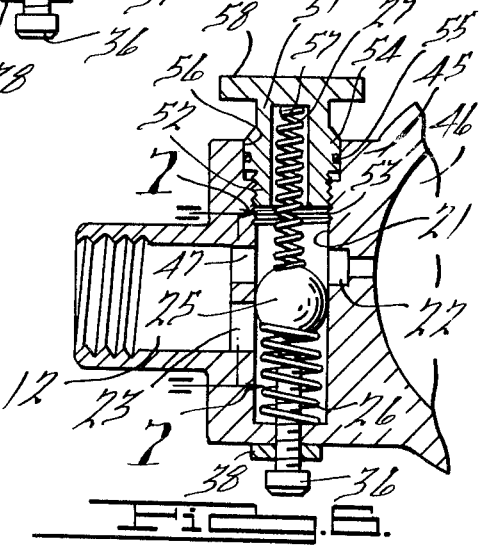
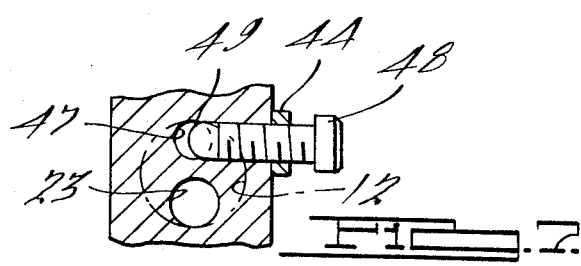
INVENTOR.
Treffle J. Leveque
BY
Harness, Dickey & Pierce
ATTORNEYS.

VALVE FOR CONTROLLING SPEED AND WORKING PRESSURE OF AIR MOTORS

BACKGROUND OF THE INVENTION

Reference may be had to applicant's U.S. Pat. No. 3,374,803 for disclosure of a valve over which the present valve is an improvement.

SUMMARY OF THE INVENTION

The invention pertains to a valve having a body containing an aperture communicating with inlet and outlet passageways which are offset relative to each other. A ball within the aperture is retained by springs to prevent the flow of air between the inlet and outlet passageways. The aperture has a thread for receiving an adjustable screw which engages one of the springs to position the ball relative to the passageways. An aperture is provided above the intake passageway and the ball, having an adjusting screw for varying the passageway therethrough for permiting an initial flow of air to occur through the outlet port to an air motor for running the motor at idling speed. When the tool driven by the motor has a load applied thereto pressure will build up in the aperture above the ball and move the ball downwardly to produce an increased flow of air from the intake passageway, to the motor to permit it to perform the required work. When the tool driven by the motor is removed from the work the ball will again close off the passage from the intake passageway and the motor will again operate at idling speed. The valve may be built as a separate unit to be applied to a motor or other device or may be built directly into the body of the motor or such device.

BRIEF DESCRIPTION OF THE DRAWING

FIG. 1 is a plan view of a valve which embodies features of the present invention;

FIG. 2 is a view of the structure illustrated in FIG. 1 as viewed from line 2-2 thereof;

FIG. 3 is a view of the structure illustrated in FIG. 1, as viewed from the line 3-3 thereof;

FIG. 4 is a sectional view of the structure illustrated in FIG. 1, taken on the line 4-4 thereof;

FIG. 5 is a broken sectional view of the structure illustrated in FIG. 3, taken on the line 5-5 thereof;

FIG. 6 is a view of structure, similar to that illustrated in FIG. 4, showing a further form which the invention may assume; and FIG. 7 is a broken sectional view of the structure illustrated in FIG. 6, taken on the line 7-7 thereof.

DESCRIPTION OF THE PREFERRED EMBODIMENTS

The valve 10 has a body 11 of rectangular shape provided with an inlet port 12 and an outlet port 13 each of which contains a threaded end. A cylindrical aperture 14 through the body receives a cylindrical member 15 having a shoulder 16 at one end and a thread 17 at the other end. An internally threaded cap 18 is screwed upon the thread 17 to clamp the shoulder 16 against the body 11. The member 15 has a central aperture 21 with an outlet passageway 22 communicating with the outlet port 13. An inlet passageway 23 is provided through the wall of the member 15 into the aperture 14 located below the outlet passageway 22 but opposite thereto within the inlet port 12. Above the inlet passageway 23 a passageway 24 is provided of much smaller diameter substantially in alignment with the outlet passageway 22 and above a ball 25 which controls the flow of air between the passageways 22 and 23.

The ball rests upon a light spring 26 in the bottom of the aperture 21 and is urged downwardly thereagainst by a spring 27 the force of which is adjusted by a screw 28 to retain the ball in the position illustrated. The spring 26 could be omitted as the pressure of air, when delivered to the fitting, would raise the ball into position of engagement with the spring 27 and close off the aperture 23. The screw 28 is screwed into a threaded aperture 29 in the cap 18 and is provided with an enlarged head 31 at the bottom containing an O-ring 32. A washer 33 is disposed over a square end 34 on the screw 28 and secured thereto by a screw 35. A screw 36 is threaded through an aperture 37 in the bottom of the member 15 for limiting the downward movement of the ball, being retained in adjusted position by a nut 38. When a valve connected to the intake port 12 from a pressure source is open, air will pass through the aperture 24 through the outlet passageway 22 to the outlet port 13. Air from the inlet passageway 23 will be cut off from the passageway 22 by the ball 25.

The aperture 24 may be of a selected diameter but when adjustment is desired, a screw 41 is threaded into the body 11 as illustrated in FIG. 5 through an aperture 42 in the body 11 having rounded projecting end 43 which extends transversely into the passageway 24 for regulating the amount of air which can pass therethrough. A nut 44 locks the screw 41 in adjusted position. Air passing through the passageway 24 will be sufficient to run an air motor at a satisfactory idling speed. When the work is engaged by a tool driven by the motor, the back pressure resulting therefrom urges the ball 25 downwardly against the tension of the spring 26. This will open the inlet passageway 23 to the passageway 22 which will deliver more air to the motor to permit the tool to perform the work intended. As back pressure continues to build up the ball will be further lowered to admit more air to the motor so that it can drive the tool with a greater force. When the tool driven by the motor no longer performs work, the ball will return to the position illustrated in FIG. 4 cutting off the supply of air between the passageways 22 and 23 and permit it to rotate at idling speed produced by the air passing through the adjusted aperture 24.

Referring to FIGS. 6 and 7, a further form of the invention is illustrated that wherein a body 45 of an air motor 46 or other device has the aperture 21 disposed therein along with the inlet passageway 23 and outlet passageway 22. The ball 25 in the aperture 21 is engaged on opposite sides by the springs 26 and 27. An inlet aperture 47 is larger than the aperture 24 and is the same size as the outlet passageway 22 so that it can be drilled from the inlet port 12. A screw 48 threaded in the wall of the body 45 and has a semispherical head 49 substantially the diameter of the aperture 47 for the purpose of controlling the flow of air through the aperture for initially driving the motor 46 at idling speed. An adjustment member 51 has a threaded end 52 screwed into the threaded section 53 at the open end of the aperture 21. The member 51 has an enlarged body 54 containing an O-ring 55 which engages the enlarged aperture 56 at the end of the threaded section. The spring 27 extends within an aperture 57 in the member 51 and an actuating portion 58 is provided on the top thereof.

The valve of FIG. 6 is the same as that illustrated in FIG. 4, except for the fact that it is built directly into the body of an air motor or other device. Both of the valves operate in the same manner for providing initial idling pressure to the motor and thereafter when work is to be done to automatically supply the necessary pressure. This pressure can be limited by adjusting the screws 36 or 48 to limit the downward movement of the ball 25.

I claim:

1. In a valve, a body having a cylindrical aperture closed at one end and having a thread at the other end, an inlet port having means for attachment to an air supply source, said inlet port having a first and second inlet passageway to said cylindrical aperture, said cylindrical aperture having an outlet passageway offset from the first inlet passageway, a ball in said cylindrical aperture having line engagement with the wall thereof, a spring resting on the top of the ball, a threaded member engageable with the thread at the end of the cylindrical aperture for adjusting the tension of said spring to position said ball to permit the flow of air from the second inlet passageway to the outlet passageway while sealing off the air from the first inlet passageway thereto, a spring provided in said cylinder below the ball for holding the ball against said first spring, a screw threaded in said body having a projecting end which is extensible into said second inlet passageway for controlling the size of the opening thereof, and a screw threaded through the closed end of the cylindrical aperture in position to limit the movement of the ball toward said end and the amount of air from said first inlet passageway to the outlet passageway.